United States Patent [19]

Kilheffer et al.

[11] Patent Number: 5,044,819
[45] Date of Patent: Sep. 3, 1991

[54] MONITORED PAVING SYSTEM

[75] Inventors: Kenneth E. Kilheffer, Waco; Keith B. Mosley, Hewitt; Robert J. Province, China Spring, all of Tex.

[73] Assignee: Scanroad, Inc., Waco, Tex.

[21] Appl. No.: 479,066

[22] Filed: Feb. 12, 1990

[51] Int. Cl.[5] .......................... E01C 19/00; B28C 7/06
[52] U.S. Cl. ........................................ 404/72; 404/84; 198/959; 177/119; 366/8; 366/18; 366/37; 366/160
[58] Field of Search ............... 404/72, 81, 84; 222/56, 222/58, 63; 366/8, 18, 34, 35, 37, 142, 160; 198/300; 177/119

[56] References Cited

U.S. PATENT DOCUMENTS

| | | |
|---|---|---|
| 3,260,176 | 7/1966 | Bowers . |
| 3,353,798 | 11/1967 | Draper et al. ........................ 366/8 |
| 3,453,939 | 7/1969 | Pollitz et al. ........................ 404/84 |
| 3,478,830 | 11/1989 | Levesque et al. .................. 198/504 |
| 3,820,914 | 6/1974 | Zimmerman ...................... 404/110 |
| 3,967,912 | 7/1976 | Parker .................................. 404/84 |
| 4,012,160 | 5/1977 | Parker .................................. 404/84 |
| 4,089,509 | 5/1978 | Morton et al. ....................... 366/8 |
| 4,222,498 | 9/1980 | Brock ................................ 222/58 |
| 4,298,288 | 11/1981 | Weisbrod ............................ 366/8 |
| 4,475,818 | 10/1984 | Bialkowski ........................ 366/17 |
| 4,506,982 | 3/1985 | Smithers et al. .................... 366/19 |
| 4,534,674 | 8/1985 | Cutler .................................. 404/75 |
| 4,781,466 | 11/1988 | Zimmerman ...................... 366/37 |
| 4,823,366 | 4/1989 | Williams .............................. 377/2 |

OTHER PUBLICATIONS

Promotional Material by "Breining Company".

Primary Examiner—Bruce M. Kisliuk
Attorney, Agent, or Firm—Baker & Botts

[57] ABSTRACT

A paving system (10) is described which comprises an aggregate hopper (12), a mineral filler hopper (14), water tank (16), an emulsion tank (18) and an additive tank (20). Aggregate, mineral filler, water, emulsion and additive are conveyed from their respective storage devices into a mixer (24) where they are mixed into paving material. A processor (34) is used in conjunction with a load cell (28), an auger tachometer (50) and flow meters (58), (62) and (66) to continuously monitor the relative amounts of aggregate mineral filler, water, emulsion and additives in the paving material mixture manufactured by system (10). A ground speed sensor (74) senses the speed of a vehicle (76) so that the processor (34) may also figure an application rate of paving material. Manual controls (46) may be used by an operator to alter the amounts of aggregate, mineral filler, water, emulsion or additive in the paving material mixture.

64 Claims, 3 Drawing Sheets

MONITORED PAVING SYSTEM

TECHNICAL FIELD OF THE INVENTION

This invention relates in general to the field of construction equipment and more particularly to an electronically monitored paving system.

BACKGROUND OF THE INVENTION

A method of creating high quality surfaces for roads, parking lots and other situations is through the use of mixed paving materials such as bituminous slurry. The manufacture of bituminous slurry, as with virtually all paving materials, requires the mixture of several ingredients. The quality of the bituminous slurry or other paving material is directly dependent on the relative amounts of these ingredients.

Present paving systems rely on calibration techniques to roughly gauge the amounts of the various constituent parts of the paving material mixture. These calibration techniques do not provide feedback as to the quality, consistency or formula of the paving material being produced as it is produced.

Other present systems allow for an operator of the system to adjust the consistency of the paving material mixture at the job site based on visual inspection of the paving material as it is mixed. These systems require highly skilled operators to be able to judge the appropriate formula of the mixture and make the necessary adjustments. Further, the systems require constant monitoring and, once again, wide variances in the quality of the paving material may result.

One of the most important considerations in the operation of a paving system is the application rate of material. Without completing an entire batch of paving material, present systems do not have any way of measuring this application rate which is commonly defined as the weight of dry material used per unit area covered. Present systems weigh the amount of material at the beginning of the job and then reweigh the system after a batch of material had been spread to determine the amount of material applied. These systems do not give useful feedback during the operation of the systems to allow for any fine adjustment to the rate of application during the application of a batch of material. Once again, a skilled operator is required to judge the appropriate rate of application by visually inspecting the application process. The existing methods give no information as to the application rates during the operation of the systems. Accordingly, a need has arisen for a paving system which allows for the monitoring of the consistency and the application rate of the paving material during the actual application of the materials. A further need has arisen for a system which incorporates the constant monitoring of the amount of materials being used without the need for the use of an entire batch of materials to gain this information. A further need therefore has arisen for a continuously monitored system such that materials may be added to the system to allow for continuous operation.

SUMMARY OF THE INVENTION

A system is provided for producing and applying paving surface material while the system proceeds over a surface to be paved. The paving surface material may comprise aggregate material, mineral filler, water, bituminous emulsion or other suitable binding agents and a chemical additive. The system is disposed on and is transported by a vehicle. The system comprises an aggregate hopper for storing the aggregate material and a conveyor for conveying the aggregate from the hopper to a mixer which mixes the aggregate with the remaining ingredients to create the paving material. A scale is associated with the conveyor and is operable to weigh the amount of aggregate material being conveyed from the aggregate hopper to the mixer. Means are provided for preventing distortions in the frame of the vehicle from substantially affecting the operation of the scale.

According to another embodiment of the present invention, systems are provided for monitoring the amounts of the other ingredients as they are introduced into the mixer. A processor system receives signals form the monitoring systems and is operable to display, using a display system, the ratios of each of the ingredients of the paving material to the amount of dry material being used by the system.

According to another embodiment of the present invention, a refill system is provided such that the aggregate hopper and the storage systems for the other ingredients may be refilled during the operation of the paving system.

According to still another embodiment of the present invention, the processor system is operable to keep a running total of the amount of each of the materials consumed during the operation of the system. In this manner, the system of the present invention is capable of continuously displaying an application rate during continuous operation of the system.

BRIEF DESCRIPTION OF THE DRAWINGS

A more complete understanding of the present invention may be acquired by referring to the detailed description and claims when considered in connection with the accompanying drawings in which like reference numbers indicate like features, and wherein:

DETAILED DESCRIPTION OF THE INVENTION

Figure 1:
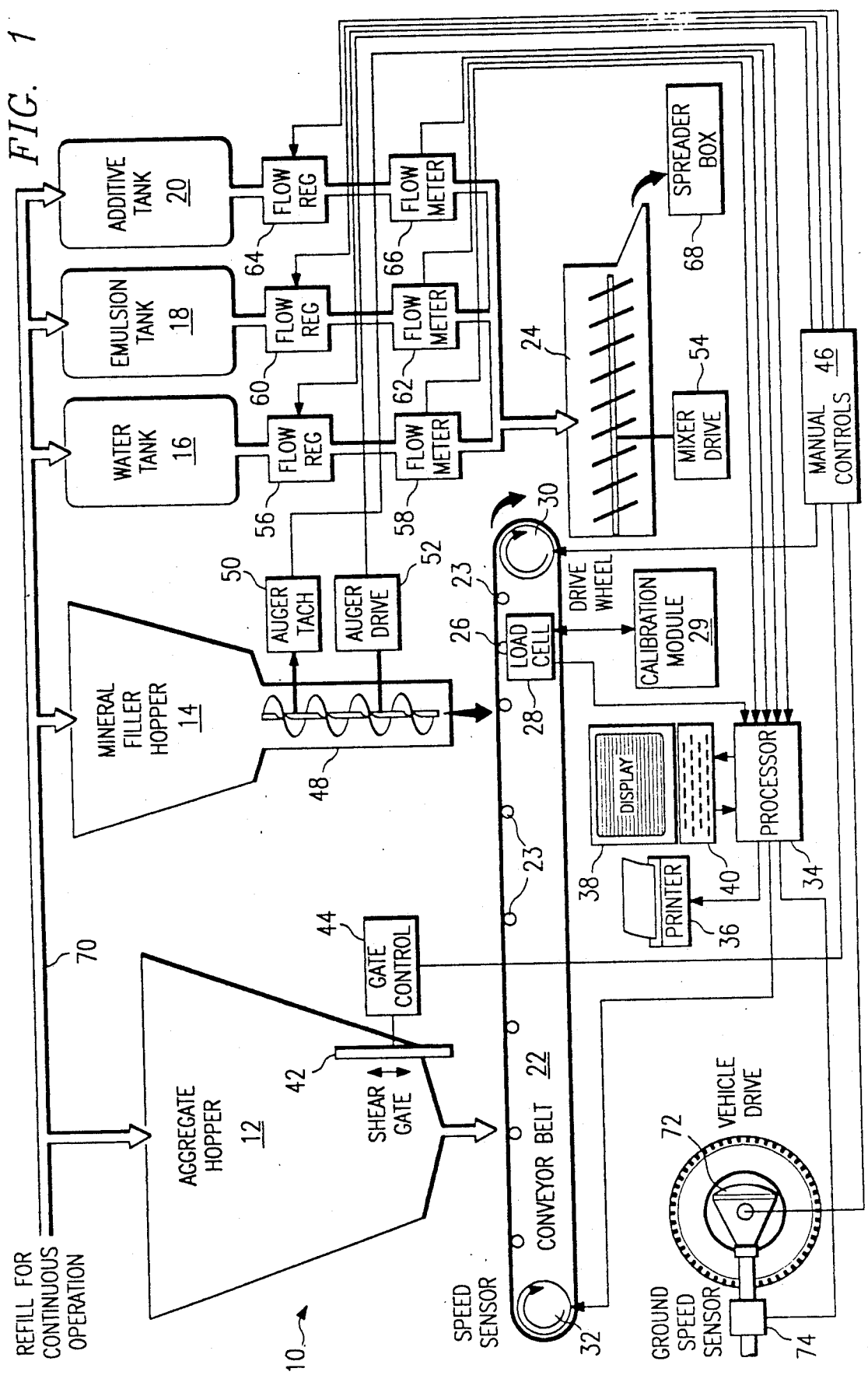
FIG. 1 is a block diagram illustrating the paving system of the present invention.

Referring to FIG. 1, a paving system indicated generally at 10 is shown in block diagram form. Paving system 10 comprises an aggregate hopper 12 operable to store aggregate which may comprise, for example, stone, slag or gravel. System 10 further comprises a mineral filler hopper 14 for storing mineral filler which may comprise, for example, Portland cement. System 10 further comprises a water tank 16, an emulsion tank 18 and an additive tank 20. The water tank 16 is operable to store water necessary for the bituminous slurry mix manufactured by the system of the present invention. The emulsion tank 18 stores the bituminous emulsion or other suitable binding agent and the additive tank 20 stores a liquid chemical additive which may comprise a catalyst or inhibitor such as a surfactant.

It should be understood that system 10 is presented herein as a bituminous slurry system solely for the purposes of teaching the present invention. The present invention is equally applicable to any paving system which requires the mixture of any number of dry or liquid components. For example, other embodiments of the paving system of the present invention could provide for monitoring of the production of concrete surface, microsurfacing, cold tar surfaces or any other surface requiring the mixture of aggregate material with a suitable binding agent. Accordingly, it should be understood that the teachings of the present invention are not limited by the presentation of the single embodiment of the bituminous slurry system 10 shown in FIGS. 1 through 3.

Referring again to FIG. 1, the aggregate hopper 12 is positioned proximate a conveyor belt 22 which conveys the aggregate and the mineral filler to a mixer 24. The conveyor belt comprises a plurality of idlers 23 scale are used to support the conveyor belt. A single idler 26 near the discharge end of the conveyor belt 22 is coupled to a load cell 28. Load cell 28 may comprise, for example, a Milltronics single idler scale, which is operable to weigh the amount of material transported on conveyor belt 12 in a region above idler wheel 26. Alternatively, a multiple idler scale could be used in place of load cell 28 which would require a corresponding number of idlers 26 coupled thereto.

The conveyor belt 22 is actuated by a drive wheel 30 proximate the discharge end of conveyor belt 22. A speed sensor 32 is also coupled to conveyor belt 22 and transmits a signal to a processor 34 as to the speed of conveyor belt 22. Speed sensor 32 may comprise, for example, an MD-Series speed sensor manufactured by Milltronics Corporation. Load cell 28 also transmits a signal to processor 34. Load cell 28 might also comprise, for example, a calibration module 29 such as a Compu-M calibration module manufactured by Milltronics. This calibration module is operable to control the operation of load cell 28 and to control the calibration and initialization of load cell 28. The addition of the calibration module allows the load cell 28 to zero itself and average out and allow for variances in the weight of conveyor belt 22 to arrive at an average tare weight acting upon load cell 28.

Processor 34 is coupled to a printer 36, a display 38 and a keypad 40. Processor 34 may comprise, for example, a microprocessor-based control system such as the SY/MAX system manufactured by Square D Corporation. The processor 34 may comprise a plurality of output modules and input modules mounted on an I/0 rack assembly. Processor 34 may further include a real time clock such that rates of application and material usage may be calculated. Further, printer 36 may comprise, for example, a forty column impact printer such as the SP-700 manufactured by Syntest Corporation. Display 38 and keypad 40 may comprise, for example, an integrated display and entry panel such as the 1×40 VIP system manufactured by Industrial Electronic Engineers, Inc.

The amount of aggregate delivered by aggregate hopper 12 on conveyor belt 22 may be controlled by a shear gate 42. Shear gate 42 is coupled to a gate control 44. Shear gate 42 contacts the aggregate as it is discharged from the aggregate hopper by conveyor belt 22 and establishes the vertical height of the aggregate material on conveyor belt 22. Gate control 44 may use hydraulic, electrical or other known mechanical means to control the height of shear gate 42 relative to the conveyor belt 22. Gate control 44 may be controlled from manual controls 46. According to one embodiment of the present invention, an operator of system 10 has access to manual controls 46 as well as the display 38 and keypad 40 to control the operation of the system 10. Alternatively, the amount of aggregate may be controlled byvarying the speed of conveyor belt 22 and maintaining a constant cross-sectional area of material being conveyed or using a combination of a shear gate and a variable speed conveyor belt 22.

The mineral filler hopper 14 is discharged onto the conveyor belt 22 through an auger 48. An auger tachometer 50 senses the rotational speed of auger 48 and transmits a signal indicative of the rotational speed of auger 48 to processor 34. The auger 48 is actuated by an auger drive train 52 which may also be controlled from manual controls 46.

The combination of the aggregate and mineral filler are discharged from conveyor belt 22 into a mixer 24 which is actuated by a mixer drive train 54. Mixer drive train 54 may also be controlled from manual controls 46 such that an operator of system 10 may vary the speed of mixer 24 during operation.

Water from water tank 16 is discharged into mixer 24 after it is passed through a flow regulator 56 and a flow meter 58. Flow regulator 56 may be remotely controlled from manual controls 46. Flow meter 58 may comprise an insertion-style flow transmitter such as the model FP5800 flow transmitter manufactured by Omega. Flow meter 58 transmits a signal associated with the amount of water flowing from water tank 16 into mixer 24 to processor 34.

It should be understood that the use of the term "flow regulator" herein should be construed broadly to include any methods by which a liquid flow might be controlled. For example, flow regulation might be accomplished through the use of conventional valves, variable displacement or variable speed pumps or other known methods. The choice of a particular system or device for flow regulation will depend on the requirements and capabilities of the system as a whole and the characteristics of the liquid flow being controlled.

Similarly, emulsion tank 18 discharges bituminous emulsion into mixer 24 through a flow regulator 60 and a flow meter 62. Flow regulator 60 may comprise a variable displacement or variable speed pump which may be remotely controlled from manual controls 46. Flow meter 62 may comprise, for example, a K-280 Altoflux compact magnetic inductive flow meter manufactured by Krohne, Inc. According to an alternate embodiment of the present invention, flow regulator 60 may be omitted and the ratio of the amount of aggregate material to the amount of bituminous emulsion may be adjusted by adjusting the amount of aggregate material using shear gate 42 and gate control 44 or by adjusting the speed of conveyor belt 22 as discussed previously.

Additive tank 20 discharges the additive into mixer 24 through a flow regulator 64 and a flow meter 66. Flow regulator 64 may comprise a conventional valve or a variable speed or variable displacement pump which may beremotely controlled from manual controls 46 through a variety of known methods. Flow meter 66 may comprise, for example, either an insertion-style flow transmitter such as the model FP-5800 manufactured by Omega used for flow regulator 56 or a Omega FTB-1000 or 1500 series oval gear positive displacement flow meter which might be more suited for the viscous nature of some additives. The mixer 24 mixes the aggregate, mineral filler, water, bituminous emulsion and additive and discharges the resulting bituminous slurry mixture into a spreader box 68 which applies it evenly on the surface to be paved as the system 10 proceeds forward.

A refill path 70 is shown in FIG. 1 coupled to aggregate hopper 12, mineral filler hopper 14, water tank 16, emulsion tank 18 and additive tank 20. It should be understood that refill path 70 may comprise a different mechanical structure for each of these separate storage facilities within system 10. For example, refill paths 70 may comprise a system of hoses and pumps coupled to water tank 16, emulsion tank 18 and additive tank 20 to refill these tanks. Further, refill path 70 may comprise a separate conveyor belt for conveying aggregate from a nurse truck [not shown] into aggregate hopper 12 within system 10. Similarly, refill path 70 may comprise a separate system to refill mineral filler hopper 14.

System 10 is a mobile system situated on a suitable carrier chassis, having a drive train 72. Drive train 72 has a ground speed sensor 74 coupled thereto. The ground speed sensor 74 transmits a signal indicative of the ground speed of the vehicle to processor 34. Alternatively, ground speed sensor 74 may comprise a variety of other devices such as sensors directly coupled to the wheels of the vehicle, radar devices or sensor wheels directly contacting the surface to be paved as it passes below the vehicle during the paving operation. Additionally, the speed of the vehicle may be remotely controlled from the manual controls 46 by coupling the drive train 72 to the manual controls 46 using known methods.

In operation, the processor 34 receives continuous inputs from the load cell 28, the speed sensor 32, the ground speed sensor 74, the auger tachometer 50, and flow meters 58, 62 and 66. Further, prior to operation of system 10, several values may be programmed into processor 34. For example, the bituminous emulsion weight, the additive weight, the mineral filler weight and the aggregate weight may be entered as weight per volume units into processor 34 through keypad 40. Further, the aggregate moisture content may be entered as a percentage such that this percentage may be subtracted from the aggregate weight to determine a dry aggregate weight. The spreader box width can be entered as a unit of width. The processor 34 may be configured to accept these programmable inputs in either metric units or in English units. The processor 34 receives the continuous inputs from the aforementioned sensors throughout system 10 and the programmed inputs described previously and selectively displays information concerning the operation of system 10 and the characteristics of the paving material output by system 10. Traditionally, the amount of bituminous emulsion, water, mineral filler and additive in the bituminous slurry material may be described as a percentage of the dry material weight where the dry material weight is defined for the present embodiment as the combined weight of the mineral filler and dry aggregate. Accordingly, the processor 34 uses the aforementioned information and may selectively output the emulsion percentage of dry material, the water percentage of dry material, the additive percentage of dry material or the mineral filler percentage of dry material. Further, the processor 34 calculates and collectively displays an application rate in unit weight per unit area such as pounds per square yard or kilograms per square meter. In addition, the processor 34 stores and continuously updates totals for the amounts of materials which have been used by system 10. For example, the processor 34 can selectively display the total weight of dry aggregate, bituminous emulsion, additive, mineral filler or water used from a selected point in time. Further, the processor 34 keeps track of and can display the total mixed weight used from a particular point in time. Additionally, the processor 34 keeps track of the total distance travelled by the vehicle carrying system 10 from a particular point of time.

To enter the initial values into the processor 34, the operator presses an appropriate touch panel key and the existing value of the programmable input is displayed. The operator then presses a "Change Display Value" key and the display will change to read, for example, "Enter the new value as pounds per gallon" or other prompts as deemed necessary. The operator may then make the proper entry using a row of numeric keys. When he is finished entering the value, the operator may press an "Enter Value" key and the new value is stored in processor 34. The alteration of values may be protected by a user code or a key switch. Additionally, before new values may be entered, the printer 36 may be programmed to automatically print the previously stored values. It should be understood that the operational interface described above is merely one embodiment presented for purposes of teaching the present invention and a variety of other interfaces could be used without departing from the scope and spirit of the present invention.

During operation of the system, the display 38 may be programmed to constantly show the application rate of the material based on dry material weight, spreader box width and the ground speed of the vehicle. This value may be programmed to be upgraded at predetermined time intervalssuch as, for example, every three minutes based on the previous three minutes material usage and ground speed.

The operator may press a "Rotate Display" key on keypad 40 and the display 38 will rotate through the values for emulsion percentage, the water percentage, the additive percentage and mineral filler percentage with a predetermined display time for each value such as five seconds per value. After the completion of one revolution through these four values, the display 38 may be programmed to revert back to a display of the application rate.

A "Select Display" key on keypad 40 may be used to instruct processor 34 and the display 38 to display the values listed below for as long as desired. The display 38 will change to the next item in the list below every time the "Select Display" key is pressed. The "Rotate Display" key described above may be pressed at any time to interrupt the "Select Display" sequence and return to the normal display of the "application rate". The following is a list illustrating one possible ordering of the values to be displayed by the system of the present invention.

1. Emulsion xx % of dry material
2. Water xx % of dry material
3. Additive xx % of dry material
4. Mineral filler xx % of dry material
5. xxxx lbs. dry aggregate total
6. xxxx lbs. emulsion total
7. xxxx lbs. additive total
8. xxxx lbs. mineral filler total
9. xxxx lbs. water total
10. xxxx lbs. mixed weight total
11. xxxx distance travelled total The values shown in 1 through 4 above are continuously updated after a predetermined period of time, for example, every three minutes. The values in 5 through 11 are totals which are also updated, for example, every three minutes and which may be reset only through special access. All the values shown above can additionally be output to the printer 36. Printer 36 will print on demand and may be programmed to start each printing cycle with a date and time block. The processor 34 may be programmed such that at the end of the day or at the end of a job the totals can be reset to zero only by the use of a special access code or key and only after receiving a printed copy of the totals for the day or for the job.

Accordingly, an operator of the bituminous slurry system of the present invention has access through processor 34, display 38 and keypad 40 to numeric values for all the constituent ingredients of the paving material being manufactured by the system 10. Further, the operator may have access to manual controls 46 to alter the rate of use of some or all of the ingredients. In addition, the operator has access through manual controls 46 to the vehicle drive train 72 to increase the ground speed of the vehicle and thus alter the application rate. The system of the present invention provides for the alteration and the monitoring of the quality of the bituminous slurry product manufactured by system 10 during its application. In comparison, present systems rely on calibration techniques and have no method, other than visual inspection of the paving material, to monitor the quality of the paving material manufactured as the paving process proceeds. The use of flow meters 58, 62 and 66, auger tachometer 50 and load cell 28 allow for the continuous monitoring of the materials used during the actual operation of system 10. Accordingly, aggregate hopper 12, mineral filler hopper 14, water tank 16, emulsion tank 18 and additive tank 20 may be refilled during the operation through refill path 70 allowing for continuous operation of system 10. Continuation operation is possible as no beginning and ending weights are required for the calibration of the system 10 because of the continuous monitoring by processor 34.

An additional programmable input which may be input into processor 34 prior to the operation of system 10 is a calibration value for mineral filler auger 48. According to one embodiment of the present invention, the amount of mineral filler discharged onto conveyor belt 22 may comprise a value which is not directly measured by a load cell or flow meter in system 10. Because of the consistency of the mineral filler stored in mineral filler hopper 14, the use of auger tachometer 50 to measure the revolutions of auger 48 is sufficiently accurate to measure the amount of mineral filler being used during the operation of system 10. Accordingly, prior to the operation of system 10, a value corresponding to the amount of mineral filler discharged by auger 48 per revolution of auger 48 may be input into processor 34.

It should also be noted that, according to the embodiment shown in FIG. 1, the load cell 28 and the idler 26 are actually placed downstream from the introduction of the mineral filler from auger 48 onto conveyor belt 22. This results in the load cell 28 actually measuring the combined weight of the aggregate discharged from aggregate hopper 12 and the mineral filler discharged from mineral filler 14. Accordingly, the signal input from load cell 28 into processor 34 comprises a combined weight of mineral filler and aggregate. The processor 34 can then subtract the amount of mineral filler and the aggregate moisture percentage from this total weight to find the weight of the dry aggregate being used. Processor 34 can be programmed to perform this calculation according to known methods. The placement of the discharge of auger 48 upstream from the load cell 28 and idler 26 is merely a design choice based on the convenient placement of the constituent components when they are mounted on the vehicle carrying system 10.

Figure 2B:
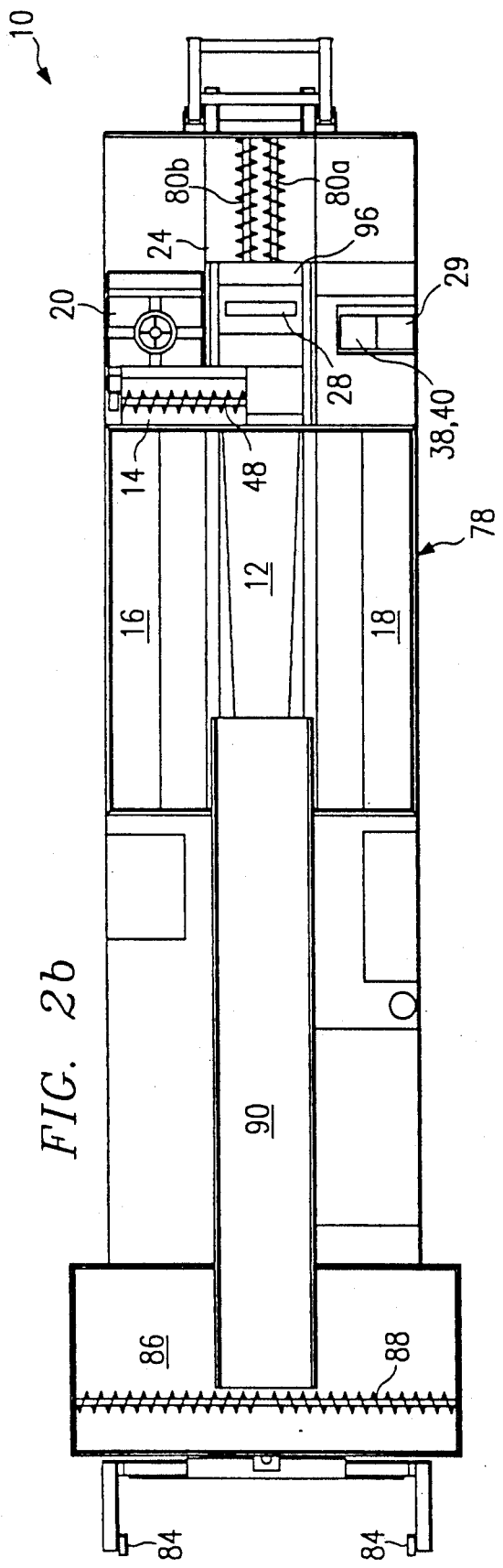
FIGS. 2a and 2b are top and side views of one embodiment of the paving system of the present invention.
Figure 2A:
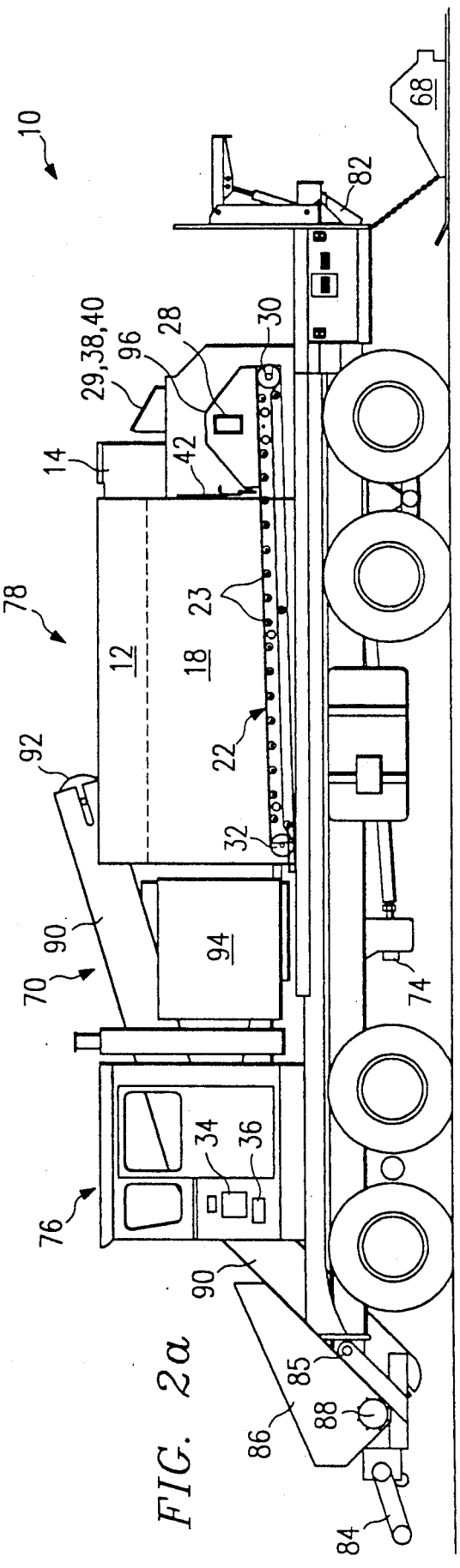

FIGS. 2a and 2b comprise side and top views respectfully of one embodiment of system 10 as it would appear mounted on a vehicle, indicated generally at 76, in FIG. 2a. The vehicle 76 illustrated in FIGS. 2a and 2b is used to transport system 10 to the job site by conventional highway travel and proceeds at a speed on the order of one-half to three miles per hour as the bituminous slurry manufactured by system 10 is applied behind the vehicle 76. Vehicle 76 is disclosed solely for the purposes of teaching the exemplary embodiment shown in FIGS. 2a and 2b and should not be construed to limit the scope of the present invention to any particular vehicle. The vehicle illustrated in FIGS. 2a and 2b may comprise, for example, a 300 horsepower engine having a 36,000 lb. front tandem rating and a 40,000 lb. rear tandem rating. Vehicle 76 may further comprise a power shift transmission having five forward speeds and two reverse speeds. The vehicle 76 might also comprise a two speed rear axle having gear ratios on the order of 5.57:1 and 7.60:1. Vehicle 76 may comprise a one-man cab and eight wheels having super single tires. Vehicle 76 may further comprise rear tandem axle set drives and may have front axle steering.

Referring to FIGS. 2a and 2b, the placement of many of the components of system 10 shown in FIG. 1 can be seen as they are mounted on vehicle 76. A rear storage area, indicated generally at 78, comprises water tank 16, aggregate hopper 12 and emulsion tank 18. Mineral filler hopper 14 is disposed rearwardly of water tank 16. Mineral filler auger 48 can be seen in FIG. 2b running the width of mineral filler hopper 14.

Conveyor belt 22 is shown in FIG. 2a to comprise drive wheel 30, speed sensor 32 and idlers 23. In operation, conveyor 22 conveys aggregate from aggregate hopper 12 beneath shear gate 42 and discharges the aggregate into the mixer 24. The load cell 28 is placed above idler 26 downstream on conveyor belt 22 from shear gate 42. Mixer 24 is shown in FIG. 2b to comprise dual rotating paddle assemblies 80a and 80b. During the operation of mixer 24, the combination of the mineral filler from mineral filler hopper 14 and the aggregate from aggregate hopper 12 are discharged by conveyor 22 into mixer 24. A combination of the water and additive is sprayed using a spray bar [not shown] over this mixture as it enters mixer 24. The emulsion is pumped from emulsion tank 18 into mixer 24 and the dual rotating paddle assemblies 80a and 80b complete the mixing of the emulsion and the wetted mixture of aggregate and mineral filler. The mixed bituminous slurry is then discharged into spreader box 68 through a chute 82 which can be seen in FIG. 2a.

An important technical advantage of the present invention inheres in the fact that the operator of the invention is positioned next to mixer 24 at the rear of vehicle 76. From this position, the operator has access to keypad 40 and display 38 and can visually inspect the paving material as it is discharged from chute 82 into spreader box 68. Further, the operator has access to manual controls from this point which can control the ground speed of vehicle 76 and the amount of emulsion, water and additive discharged into mixer 24. Further, the operator may open or close shear gate 42 from this point to increase or decrease the amount of aggregate being fed in mixer 24. Additionally, the operator may regulate the amount of mineral filler fed into mixer 24 by regulating auger drive 52. In this manner, using the information displayed to the operator as to the application rate or relative ratios of the components of the bituminous slurry displayed using display 38 and keypad 40, the operator can constantly maintain the desired consistency and quality of paving material being deposited by system 10 behind vehicle 76.

A further technical advantage of the system of the present invention inheres in the fact that the system is readily adapted to become a continuous operation system as was described with reference to refill path 70 in FIG. 1. One possible embodiment of refill path 70 is shown in FIG. 2a and 2b. At the front of the vehicle 76, a hitch 84 which may comprise, for example, a Layton hitch, is placed so that a nurse truck [not shown] can be removably coupled to the front of vehicle 76. The nurse truck may carry a plurality of tanks storing emulsion and water which can be pumped into emulsion tank 18 and water tank 16 while the nurse truck is coupled to the hitch 84. The nurse truck may also comprise a hopper containing aggregate and a loading conveyor to refill aggregate hopper 12. The aggregate in the nurse truck is conveyed into a hopper 86 shown in FIG. 2a and 2b. The hopper 86 contains a distribution auger 88 running across its width. As the aggregate is loaded from the nurse truck into hopper 86, the distribution auger 88 channels the aggregate hopper 86 to a loading conveyor 90 which conveys the aggregate from the refill hopper 86 into the main aggregate hopper 12. Loading conveyor 90 is driven by a drive wheel 92.

Accordingly, the aggregate, bituminous emulsion and water may be refilled from a nurse truck using suitable methods during the operation of the system 10 while the vehicle 76 is proceeding forward through the use of the hitch 84 and the refill system 70. The mineral filler and additive may be refilled by hand or using other suitable methods during operation of system 10.

Hopper 86 is removable and hitch 84 is operable to rotate around a pivot 85. In this manner, vehicle 76 is able to travel as a conventional highway vehicle. An important technical advantage of the system of the present invention is its ability to be transported to the job site without the use of a hauling vehicle or low-boy trailer common with some present systems. Vehicle 76 is capable of conventional highway travel as well as performing its function during the application of paving material manufactured by system 10.

An important consideration in the construction and operation of system 10 is the accuracy of load cell 28 in the measurement of the dry material being conveyed on conveyor belt 22. Traditionally, as discussed previously, all of the components of the paving material mixture are measured as a ratio to the weight of the dry material in the mixture. Accordingly, any error in the measurement of the dry material will be included in all measurements calculated by processor 34.

Figure 3:
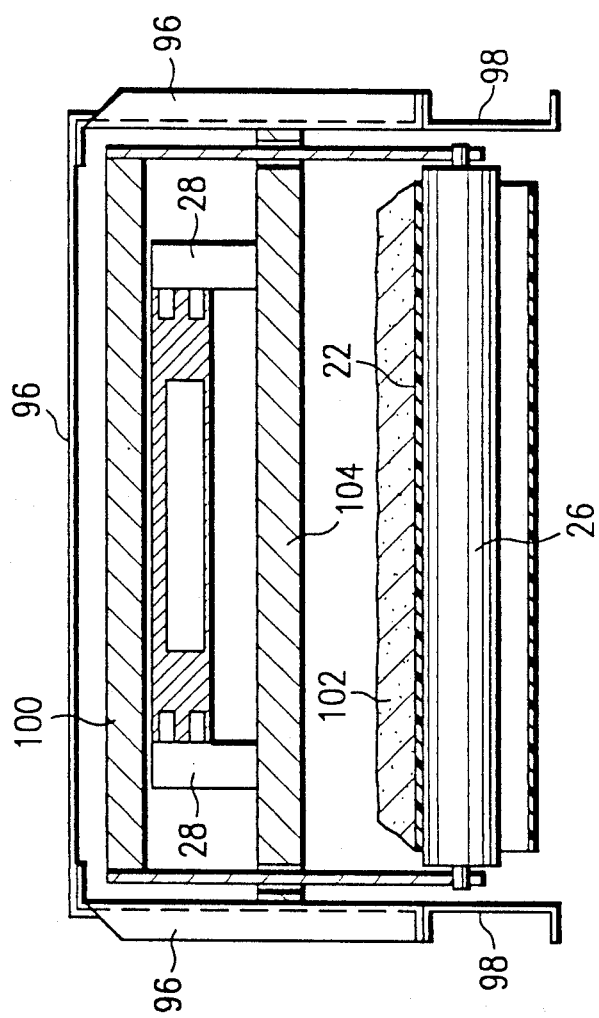
FIG. 3 is a cross-sectional elevational diagram of the belt scale system used in the paving system of the present invention.

As vehicle 76 proceeds during the operation of system 10, the vehicle may encounter road conditions which may cause the frame of the vehicle 76 to twist or deform in other ways. These forces on the frame must be prevented from affecting the idler bar 26 or the assembly holding load cell 28. The forces acting upon the frame of vehicle 76 could cause erroneous readings in load cell 28 if the frame of conveyor belt 22 were to twist along with the frame of vehicle 76. Accordingly, a scale housing 96, which is shown in greater detail in FIG. 3, is constructed around load cell 28 to prevent forces from acting upon conveyor belt 22 proximate idler 26 and load cell 28. Further, the area of the frame of conveyor belt 22 near idler 26 may be stiffened so that the frame will twist to match road conditions in other areas but not near scale housing 96.

The vehicle 76 has been chosen because of the configuration of its frame helps to prevent erroneous measurements by load cell 28. Other vehicles not having the characteristics of vehicle 76 may be used in conjunction with system 10 as long as appropriate precautions are taken to protect load cell 28 from the error-causing influences discussed above. For example, conveyor belt 22 may be mounted to the frame of a vehicle on pivots or springs to prevent the twisting of the frame to affect load cell 28. Further, the frame of conveyor belt 22 could be completely isolated from the frame of the vehicle by suspending the frame of conveyor belt 22 from aggregate hopper 12. Further, a variety of combinations of stiffening agents in the area of the frame of conveyor belt 22 proximate the load cell 28 and methods of isolation such as pivots or spring mounts could be constructed depending upon the configuration of a particular vehicle. The presentation of the vehicle 76 and the methods used to isolate load cell 28 from vehicle 76 should not be construed to limit the scope of the present invention to this or any particular embodiment.

FIG. 3 is a cross-sectional diagram which illustrates the construction of scales housing 96 and the positioning of load cell 28. Referring to FIG. 3, scale housing 96 can be seen rigidly affixed to conveyor frame 98. The idler bar 26 is disposed beneath the conveyor belt 22 which is shown conveying an exemplary amount of aggregate indicated at 102. Idler bar 26 is suspended by a translation member 100 which communicates the weight passing over idler bar 26 to load cell 28. Load cell 28 is mounted on a cross bar 104 rigidly affixed across housing 96.

In summary, a system for manufacturing and depositing paving material has been disclosed which comprises a processor 34 operable to monitor the amounts of the components of the paving material during the paving process. An important technical advantage of the system of the present invention inheres in the fact that an operator of the present invention does not need to rely on visual inspection of the paving material during its production to gain information on the quality of the paving material being produced. According to one embodiment of the present invention, the operator has access to a display 38 which can inform the operator at any time the application rate of the paving material, the ratio of any component of the paving material to the dry material within the paving material, or totals of any of the components used from a preselected point in time. In this manner, the quality of the paving material manufactured by the system of the present invention can be constantly monitored without the use of the inaccurate calibration techniques common in presently used systems.

An additional important technical advantage of the present invention inheres in the fact that the present invention is adaptable to become a continuous operation system through the addition of a refill path 70. In summary, a nurse truck may be removably coupled to the front of the vehicle carrying the system and the ingredients of the paving material can be loaded into the appropriate places within system 10 from the nurse truck. In this manner, system 10 can continuously operate without having to stop to reload materials. Because of the ability of the system of the present invention to continuously monitor the production of the paving material, the refilling of the components will not affect the characteristics or quality of the paving material manufactured by system 10.

A further important technical advantage of the system of the present invention is that it is adaptable to be mounted on a vehicle 76 which is capable of highway travel. Accordingly, the system 10 can be transported to a job site without the necessity of a hauling vehicle and trailer common with present continuous operation systems and some batch operation systems.

Although the present invention has been described in detail, it should be understood that various changes, substitutions and alterations can be made hereto without departing from the spirit and scope of the invention as defined by the appended claims.

What is claimed is:

1. A mobile system disposed on and transportable by a vehicle comprising a frame, the system operable to produce and apply paving surface material to a surface while the system and the vehicle proceed over the surface, the paving surface material comprising a plurality of ingredients comprising aggregate, the system comprising:
   a conveyor for conveying the aggregate;
   a scale associated with said conveyor and operable to generate an aggregate signal indicative of the weight of aggregate material being conveyed; and
   means for preventing distortions of the frame of the vehicle from substantially affecting the generation of said aggregate signal by said scale.

2. The system of claim 1 and further comprising:
   an aggregate hopper for storing the aggregate; and
   a mixer for mixing the aggregate with the remaining ingredients to produce the paving surface material.

3. The system of claim 2 wherein the vehicle is capable of independent highway travel such that the system may be transported to a job site by the vehicle.

4. The system of claim 2 and further comprising:
   aggregate refill means for refilling said aggregate hopper during the operation of the system such that the system is capable of continuous operation.

5. The system of claim 4 wherein said aggregate refill means comprises:
   load conveyor means disposed such that aggregate conveyed by said load conveyor means is discharged into said aggregate hopper; and
   a refill aggregate hopper disposed adjacent said load conveyor means such that aggregate may be conveyed from said refill aggregate hopper by said load conveyor means.

6. The system of claim 5 wherein said aggregate refill means further comprises:
   nurse truck hitch means for removably coupling the vehicle to a nurse truck such that aggregate brought to the system by the nurse truck can be transferred from the nurse truck to said refill aggregate hopper while the vehicle proceeds.

7. The system of claim 6 wherein said nurse truck hitch means comprises a Layton hitch.

8. The system of claim 2 and further comprising:
   a spreader box operable to receive the paving surface material discharged by said mixer and distribute the paving surface material on the surface as the vehicle proceeds.

9. The system of claim 2 and further comprising:
   a processor system coupled to said scale and operable to receive said aggregate signal from said scale; and
   a display system coupled to said processor system and operable to display values and characters generated by said processor system.

10. The system of claim 9 and further comprising:
    a printer coupled to said processor system such that values and characters generated by said processor system can be selectively printed out.

11. The system of claim 9 wherein said processor system is operable to keep a running total of the amount of aggregate used since a selected point in time using said aggregate signal.

12. The system of claim 9 and further comprising:
    a shear gate proximate said conveyor for controlling the quantity of aggregate being conveyed from said aggregate hopper to said mixer; and
    a shear gate controller for adjusting said shear gate and disposed proximate the rear of the system such that an operator of the system may view the paving surface material being applied by the system and adjust the quantity of aggregate being conveyed from said aggregate hopper to said mixer.

13. The system of claim 9 wherein the ingredients comprise mineral filler and further comprising:
    a mineral filler hopper operable to hold the mineral filler;
    means for conveying mineral filler from said mineral filler hopper to said mixer;
    mineral filler measurement means for measuring the amount of mineral filler being conveyed to said mixer, said mineral filler measurement means coupled to said processor system and operable to transmit a mineral filler signal to said processor system indicative of the amount of mineral filler being conveyed to said mixer; and
    said processor system operable to receive said mineral filler signal and to calculate a mineral filler value indicative of the amount of the mineral filler being conveyed to the mixer, said display system operable to display said mineral filler value.

14. The system of claim 13 wherein said processor system is operable to keep a running total of the amount of mineral filler used since a selected point in time using said mineral filler signal.

15. The system of claim 13 and further comprising:
    mineral filler control means coupled to said means for conveying for adjusting the amount of mineral filler being conveyed to said mixer, said mineral filler control means disposed proximate said display system such that an operator of the system may view said display system and adjust the amount of mineral filler being conveyed to said mixer.

16. The system of claim 15 wherein said means for conveying comprises auger means and wherein said mineral filler quantity control means comprises auger drive means coupled to said auger means operable to drive said auger at various speeds selectable by the operator of the system, said auger drive means being remotely controllable by the operator of the system from a location proximate said display system.

17. The system of claim 16 wherein said auger means is operable to convey the mineral filler from said mineral filler hopper to said conveyor such that the aggregate and the mineral filler are introduced into said mixer together.

18. The system of claim 16 wherein said scale is disposed such that a combined weight of aggregate and mineral filler is measured by said scale, said aggregate signal indicative of said combined weight, said processor system operable to subtract the weight of said mineral filler from said combined weight to find the weight of the aggregate being conveyed to said mixer, said processor operable to calculate the weight of the mineral filler being conveyed to the mixer using said mineral filler signal.

19. The system of claim 16 wherein said mineral filler signal comprises a signal indicating the revolutions of said auger means, said processor operable to receive a quantity per revolution value prior to operation of the system, the system further comprising a keypad coupled to said processor system such that said quantity per revolution value may be entered prior to operation of the system, the processor system operable to calculate the quantity of mineral filler being conveyed to said mixer using said signal indicating the revolutions of said auger means and said quantity per revolution value.

20. The system of claim 9 wherein the ingredients further comprise water and further comprising:
a water tank operable to hold the water;
means for conveying water from said water tank to said mixer;
water measurement means for measuring the amount of water being conveyed to said mixer, said water measurement means coupled to said processor system and operable to transmit a water quantity signal to said processor system indicative of the amount of water being conveyed to said mixer; and
said processor system operable to receive said water quantity signal and to calculate a water value indicative of the amount of water being conveyed to the mixer, said display system operable to display said water value.

21. The system of claim 20 wherein said processor system is operable to keep a running total of the amount of water used since a selected point in time using said water signal.

22. The system of claim 20 and further comprising:
water quantity control means coupled to said means for conveying the water for adjusting the amount of water being conveyed to said mixer, said water quantity control means disposed proximate said display system such that an operator of the system may view said display system and adjust the amount of water being conveyed to said mixer.

23. The system of claim 20 and further comprising:
water refill means for refilling said water tank during the operation of the system such that the system is capable of continuous operation.

24. The system of claim 23 wherein said water refill means comprises:
nurse truck hitch means for removably coupling the vehicle to a nurse truck such that water brought to the system by the nurse truck can be transferred from the nurse truck to said water tank while the vehicle proceeds.

25. The system of claim 9 wherein the ingredients comprise bituminous emulsion and further comprising:
a bituminous emulsion tank operable to hold the bituminous emulsion;
means for conveying bituminous emulsion from said bituminous emulsion tank to said mixer;
bituminous emulsion measurement means for measuring the amount of bituminous emulsion being conveyed to said mixer, said bituminous emulsion measurement means coupled to said processor system and operable to transmit a bituminous emulsion signal to said processor system indicative of the amount of bituminous emulsion being conveyed to said mixer; and
said processor system operable to receive said bituminous emulsion signal and to calculate a bituminous emulsion value indicative of the amount of bituminous emulsion being conveyed to the mixer, said display system operable to display said bituminous emulsion value.

26. The system of claim 25 wherein said processor system is operable to keep a running total of the amount of bituminous emulsion used since a selected point in time using said bituminous emulsion signal.

27. The system of claim 25 and further comprising:
bituminous emulsion quantity control means coupled to said means for conveying the bituminous emulsion for adjusting the amount of bituminous emulsion being conveyed to said mixer, said bituminous emulsion quantity control means disposed proximate said display system such that an operator of the system may view said display system and adjust the amount of bituminous emulsion being conveyed to said mixer.

28. The system of claim 25 and further comprising:
bituminous emulsion refill means for refilling said bituminous emulsion tank during the operation of the system such that the system is capable of continuous operation.

29. The system of claim 28 wherein the system is disposed on a vehicle and wherein said bituminous emulsion refill means comprises:
nurse truck hitch means for removably coupling the vehicle to a nurse truck such that bituminous emulsion brought to the system by the nurse truck can be transferred from the nurse truck to said bituminous emulsion tank while the vehicle proceeds.

30. The system of claim 9 wherein the ingredients comprise a chemical additive and further comprising:
an additive tank operable to hold the additive;
means for conveying additive from said additive tank to said mixer;
additive measurement means for measuring the amount of additive being conveyed to said mixer, said additive measurement means coupled to said processor system and operable to transmit an additive signal to said processor system indicative of the amount of additive being conveyed to said mixer; and
said processor system operable to receive said additive signal and to calculate an additive value indicative of the amount of additive being conveyed to the mixer, said display system operable to display said additive value.

31. The system of claim 30 wherein said processor system is operable to keep a running total of the amount of additive used since a selected point in time using said additive signal.

32. The system of claim 30 and further comprising:
additive control means coupled to said means for conveying the additive for adjusting the amount of additive being conveyed to said mixer, said additive control means disposed proximate said display system such that an operator of the system may view said display system and adjust the amount of additive being conveyed to said mixer.

33. The system of claim 9 and further comprising:
ground speed measurement means coupled to the vehicle and to said processor system and operable to transmit a ground speed signal to said processor system indicative of the ground speed of the vehicle; and
said processor system operable to receive said ground speed signal and operable to calculate an application rate from information comprising the ground speed of the vehicle and the amount of dry material being conveyed to said mixer.

34. The system of claim 33 wherein said processor system is operable to keep a running total of the distance traveled by the vehicle using said ground speed signal.

35. The system of claim 33 and further comprising:
ground speed control means coupled to the vehicle and disposed proximate the rear of the vehicle such that an operator of the system may view the paving surface material being applied by the system and adjust the ground speed of the vehicle.

36. A mobile system for producing and applying bituminous slurry to a surface, the bituminous slurry comprising ingredients comprising aggregate material, mineral filler, water, bituminous emulsion and chemical additive, the system disposed on and transportable by a vehicle comprising a frame, the system comprising:
an aggregate hopper for storing the aggregate;
a mixer coupled for mixing the aggregate with the remaining components to create the bituminous slurry;
a conveyor for conveying the aggregate from said aggregate hopper to said mixer;
a scale associated with said conveyor and operable to generate an aggregate signal indicative of the weight of aggregate being conveyed to said mixer;
means for preventing distortions of the frame of the vehicle from substantially affecting the generation of said aggregate signal by said scale;
a processor system coupled to said scale and operable to receive said aggregate signal from said scale;
a display system coupled to said processor system and operable to display values and characters generated by said processor system;
a mineral filler hopper operable to hold the mineral filler;
means for conveying mineral filler from said mineral filler hopper to said mixer;
mineral filler measurement means for measuring the amount of mineral filler being conveyed to said mixer, said mineral filler measurement means coupled to said processor system and operable to transmit a mineral filler signal to said processor system indicative of the amount of mineral filler being conveyed to said mixer, said processor system operable to receive said mineral filler signal and to calculate a mineral filler value indicative of the amount of the mineral filler being conveyed to the mixer, said display system operable to display said mineral filler value;
a water tank operable to hold the water;
means for conveying water from said water tank to said mixer;
water measurement means for measuring the amount of water being conveyed to said mixer, said water measurement means coupled to said processor system and operable to transmit a water quantity signal to said processor system indicative of the amount of water being conveyed to said mixer, said processor system operable to receive said water quantity signal and to calculate a water value indicative of the amount of water being conveyed to the mixer, said display system operable to display said water value;
a bituminous emulsion tank operable to hold the bituminous emulsion;
means for conveying bituminous emulsion from said bituminous emulsion tank to said mixer;
bituminous emulsion measurement means for measuring the amount of bituminous emulsion being conveyed to said mixer, said bituminous emulsion measurement means coupled to said processor system and operable to transmit a bituminous emulsion signal to said processor system indicative of the amount of bituminous emulsion being conveyed to said mixer, said processor system operable to receive said bituminous emulsion signal and to calculate a bituminous emulsion value indicative of the amount of bituminous emulsion being conveyed to the mixer, said display system operable to display said bituminous emulsion value;
an additive tank operable to hold the additive;
means for conveying additive from said additive tank to said mixer;
additive measurement means for measuring the amount of additive being conveyed to said mixer, said additive measurement means coupled to said processor system and operable to transmit an additive signal to said processor system indicative of the amount of additive being conveyed to said mixer, said processor system operable to receive said additive signal and to calculate an additive value indicative of the amount of additive being conveyed to the mixer, said display system operable to display said additive value; and
distance measurement means coupled to the vehicle and operable to generate a distance signal indicative of the distance travelled by the vehicle, said processor system operable to calculate an application rate from information comprising the distance travelled by the vehicle and the amount of dry material being conveyed to said mixer.

37. The system of claim 36 and further comprising:
shear gate means proximate said conveyor for controlling the quantity of aggregate being conveyed from said aggregate hopper to said mixer; and
shear gate control means for adjusting said shear gate means and disposed proximate the rear of the vehicle such that an operator of the system may view the bituminous slurry being applied by the system and adjust the quantity of aggregate being conveyed from said aggregate hopper to said mixer.

38. The system of claim 36 and further comprising:
mineral filler quantity control means coupled to said means for conveying mineral filler for adjusting the amount of mineral filler being conveyed to said mixer, said mineral filler quantity control means disposed proximate said display system such that an operator of the system may view said display system and adjust the amount of mineral filler being conveyed to said mixer.

39. The system of claim 36 and further comprising:
water quantity control means coupled to said means for conveying water for adjusting the amount of water being conveyed to said mixer, said water quantity control means disposed proximate said display system such that an operator of the system may view said display system and adjust the amount of water being conveyed to said mixer.

40. The system of claim 36 and further comprising:
bituminous emulsion quantity control means coupled to said means for conveying bituminous emulsion for adjusting the amount of bituminous emulsion being conveyed to said mixer, said bituminous emulsion quantity control means disposed proximate said display system such that an operator of the system may view said display system and adjust the amount of bituminous emulsion being conveyed to said mixer.

41. The system of claim 36 and further comprising:
additive control means coupled to said means for conveying additive for adjusting the amount of additive being conveyed to said mixer, said additive control means disposed proximate said display system such that an operator of the system may view said display system and adjust the amount of additive being conveyed to said mixer.

42. The system of claim 36 and further comprising:
ground speed control means coupled to said vehicle and disposed proximate the rear of the vehicle such that an operator of the system may view the bituminous slurry being applied by the system and adjust the ground speed of the vehicle.

43. A method of applying a surface of paving surface material having ingredients comprising aggregate, comprising the steps of:
transporting the ingredients of the paving surface material on a vehicle;
mixing the ingredients to form paving surface material in a mixer disposed on the vehicle;
weighing on the vehicle the amount of aggregate being conveyed to the mixer;
preventing the movement of the vehicle resulting from said step of transporting from substantially affecting said step of Weighing; and
distributing the paving surface material from the vehicle to form the surface.

44. The method of claim 43 and further comprising the steps of:
displaying on a display system the amount of aggregate being conveyed to the mixer responsive to said step of weighing; and
adjusting the amount of aggregate being conveyed to the mixer responsive to said step of displaying to adjust the consistency of the paving surface material.

45. The method of claim 43 and further comprising the step of keeping a running total of the amount of aggregate used since a preselected point in time.

46. The method of claim 43 and further comprising the step of loading aggregate onto the vehicle while the paving surface material is being applied.

47. The method of claim 43 wherein said step of transporting comprises the steps of:
transporting the ingredients of the paving surface material to a job site using the vehicle where the vehicle is capable of independent highway travel; and
transporting the ingredients of the paving surface material using the vehicle during said step of distributing the paving surface material.

48. The method of claim 43 and further comprising the steps of:

monitoring the distance the vehicle has traveled as the paving surface material is applied; and
calculating an application rate of the paving surface material using the distance the vehicle has traveled.

49. The method of claim 43 wherein the ingredients comprise bituminous emulsion and further comprising the step of monitoring the amount of bituminous emulsion being used in the mixer.

50. The method of claim 49 and further comprising the steps of:
displaying on a display system the amount of bituminous emulsion being used in the mixer responsive to said step of monitoring; and
adjusting the amount of bituminous emulsion being used in the mixer responsive to said step of displaying to adjust the consistency of the paving surface material.

51. The method of claim 49 and further comprising the step of keeping a running total of the amount of bituminous emulsion used since a preselected point in time.

52. The method of claim 49 and further comprising the step of loading bituminous emulsion onto the vehicle while the paving surface material is being applied.

53. The method of claim 43 wherein the ingredients comprise a chemical additive and further comprising the step of monitoring the amount of chemical additive being used in the mixer.

54. The method of claim 53 and further comprising the steps of:
displaying on a display system the amount of chemical additive being used in the mixer responsive to said step of monitoring; and
adjusting the amount of chemical additive being used in the mixer responsive to said step of displaying to adjust the consistency of the paving surface material.

55. The method of claim 53 and further comprising the step of keeping a running total of the amount of chemical additive used since a preselected point in time.

56. The method of claim 53 and further comprising the step of loading chemical additive onto the vehicle while the paving surface material is being applied.

57. The method of claim 43 wherein the ingredients comprise water and further comprising the step of monitoring the amount of water being used in the mixer.

58. The method of claim 57 and further comprising the steps of:
displaying on a display system the amount of water being used in the mixer responsive to said step of monitoring; and
adjusting the amount of water being used in the mixer responsive to said step of displaying to adjust the consistency of the paving surface material.

59. The method of claim 57 and further comprising the step of keeping a running total of the amount of water used since a preselected point in time.

60. The method of claim 57 and further comprising the step of loading water onto the vehicle while the paving surface material is being applied.

61. The method of claim 43 wherein the ingredients comprise mineral filler and further comprising the step of monitoring the amount of mineral filler being used in the mixer.

62. The method of claim 61 and further comprising the steps of:

displaying on a display system the amount of mineral filler being used in the mixer responsive to said step of monitoring; and adjusting the amount of mineral filler being used in the mixer responsive to said step of displaying to adjust the consistency of the paving surface material.

63. The method of claim 61 and further comprising the step of keeping a running total of the amount of mineral filler used since a preselected point in time.

64. The method of claim 61 and further comprising the step of loading mineral filler onto the vehicle while the paving surface material is being applied.

* * * * *

UNITED STATES PATENT AND TRADEMARK OFFICE
CERTIFICATE OF CORRECTION

PATENT NO. : 5,044,819
DATED : September 3, 1991
INVENTOR(S) : Kenneth E. Kilheffer, et al It is certified that error appears in the above-identified patent and that said Letters Patent is hereby corrected as shown below:

Column 1, line 58, delete "therefore".
Column 2, line 14, delete "form" and insert --from-- therefor.
Column 3, line 15, delete "scale" and insert --which-- therefor.
Column 3, line 19, after "scale" delete ",".
Column 4, line 4, delete "byvarying" and insert --by varying-- therefor.
Column 4, line 58, delete "beremotely" and insert --be remotely-- therefor.
Column 6, line 33, delete "intervalssuch" and insert --intervals such-- therefor.
Column 6, line 56, after "Emulsion" insert -- = --.
Column 6, line 57, after "Water" insert -- = --.
Column 6, line 58, after "Additive" insert -- = --.
Column 6, line 59, after "filler" insert -- = --.
Column 7, line 23, delete "ofthe" and insert --of the-- therefor.
Column 8, line 64, delete "tokeypad" and insert --to keypad--.
Column 9, line 50, delete "ofconventional" and insert --of conventional--.
Column 12, line 25, delete "thequantity" and insert --the quantity--.

Signed and Sealed this

First Day of June, 1993

Attest:

MICHAEL K. KIRK

Attesting Officer

Acting Commissioner of Patents and Trademarks